(12) United States Patent
Lee et al.

(10) Patent No.: US 8,486,852 B2
(45) Date of Patent: Jul. 16, 2013

(54) CATALYST FOR DIESEL PARTICLE FILTER, PREPARATION METHOD OF THE SAME, AND SOOT REDUCTION DEVICE OF DIESEL ENGINE INCLUDING THE SAME

(75) Inventors: Ho-In Lee, Seoul (KR); Yeon-Su Kim, Seoul (KR); Yong-Kwon Chung, Seongnam-si (KR); Jin Ha Lee, Seoul (KR); Jie Won Park, Suwon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 13/550,356

(22) Filed: Jul. 16, 2012

(65) Prior Publication Data

US 2012/0282147 A1    Nov. 8, 2012

Related U.S. Application Data

(62) Division of application No. 12/946,740, filed on Nov. 15, 2010.

(30) Foreign Application Priority Data

Jul. 9, 2010    (KR) ........................ 10-2010-0066378

(51) Int. Cl.
*B01J 23/00*    (2006.01)
*B01J 21/00*    (2006.01)
*B01J 20/00*    (2006.01)
*C22C 28/00*    (2006.01)
*C22C 5/04*    (2006.01)
*H01M 4/02*    (2006.01)
*H01M 4/36*    (2006.01)
*H01M 4/92*    (2006.01)

(52) U.S. Cl.
USPC ........... 502/262; 502/263; 502/302; 502/339; 420/416; 420/466; 429/524

(58) Field of Classification Search
USPC ................. 502/262, 263, 302, 339; 420/416, 420/466; 429/524
See application file for complete search history.

(56) References Cited

U.S. PATENT DOCUMENTS

| | | | |
|---|---|---|---|
| 4,172,853 | A | 10/1979 | Antos |
| 4,995,923 | A | 2/1991 | Mizumoto et al. |
| 5,062,885 | A | 11/1991 | Matsumoto et al. |
| 5,208,200 | A | 5/1993 | Soled et al. |
| 5,282,946 | A | 2/1994 | Kinoshita et al. |
| 5,336,337 | A | 8/1994 | Funayama et al. |
| 5,457,253 | A | 10/1995 | Soled et al. |
| 5,593,517 | A | 1/1997 | Saito et al. |
| 2010/0092358 | A1 | 4/2010 | Koegel et al. |
| 2011/0011068 | A1 | 1/2011 | Ren et al. |

FOREIGN PATENT DOCUMENTS

JP    2000-202290 A    7/2000

*Primary Examiner* — Cam N. Nguyen
(74) *Attorney, Agent, or Firm* — Morgan, Lewis & Bockius LLP

(57) ABSTRACT

A catalyst for diesel particle filter includes a platinum (Pt)-neodymium (Nd) alloy that is carried in silica, a preparation method thereof and a soot reduction device for diesel engine including the same, wherein the catalyst for diesel particle filter can maintain high catalyst activity and implement high nitrogen monoxide (NO) conversion efficiency even though it is used under the high temperature or vulcanization condition for a long time.

5 Claims, 7 Drawing Sheets

CATALYST FOR DIESEL PARTICLE FILTER, PREPARATION METHOD OF THE SAME, AND SOOT REDUCTION DEVICE OF DIESEL ENGINE INCLUDING THE SAME

CROSS-REFERENCE TO RELATED APPLICATION

This is a Divisional application of U.S. patent application Ser. No. 12/946,740, filed Nov. 15, 2010, which application claims priority to and the benefit of Korean Patent Application No. 10-2010-0066378 filed in the Korean Intellectual Property Office on Jul. 9, 2010, the entire contents of which applications are incorporated herein for all purposes by this reference.

BACKGROUND OF THE INVENTION

1. Field of the Invention

The present invention relates to a catalyst for diesel particle filter, a preparation method thereof and a soot reduction device for diesel engine including the same. More particularly, the present invention relates to a catalyst for diesel particle filter that can maintain high catalyst activity and implement high nitrogen monoxide (NO) conversion efficiency even though it is used under the high temperature or vulcanization condition for a long time, a preparation method thereof and a soot reduction device for diesel engine including the same.

2. Description of the Related Art

In general, even though a diesel engine has excellent fuel efficiency or output, since combustion is performed in a state where air excessive ratio is high because of a characteristic of a diesel engine, the exhaust amount of carbon monoxide (CO) or hydrocarbon is small in a exhaust gas unlike a gasoline engine, but nitrogen oxides (hereinafter, referred to as "NOx") and particulate matter (PM) are exhausted in a great amount.

In respect to the exhaustion of the particulate matter (PM), a large reduction is ensured through the combustion control, but since the particulate matter (PM) and NOx are in inverse relationship, if NOx is lowered, the particulate matter (PM) is increased, and the particulate matter (PM) is lowered, NOx is increased, such that it is difficult to control reduction of both of them simultaneously.

Particularly, recently, it is reported that the particulate matter (PM) is the most important main factor that contaminates the atmosphere in various media, and it is known that it harmfully affects a human body. As a method for reducing a particulate matter (PM), a diesel particle filter (DPF) is installed in a diesel vehicle. After the diesel particle filter physically collects the particulate matter (PM) that is exhausted from the diesel engine in the filter, the temperature of the exhaust gas is increased to a predetermined temperature or more by a post injection, such that the particulate matter (PM) that is collected in the filter is combusted, thereby removing it. Recently, in order to cope with the regulation of the exhaust gas that is reinforced over the world, a method for reducing the amount of NOx that is exhausted by providing a device for decomposing or reducing NOx at a front end of the diesel particle filter (DPF).

However, because of the installation of the device for decomposing or reducing NOx, the amount of nitrogen dioxide that inflows to the diesel particle filter (DPF) is largely lowered, such that a natural regeneration effect is largely deteriorated by the reaction of soot and nitrogen dioxide that are collected in the DPF. Therefore, development of a method for satisfying the regulation of the exhaust gas that is applied to diesel engine vehicles and completely removing the exhaust gas and fine dust that are discharged from the diesel engine is required.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to provide a catalyst for diesel particle filter that can maintain high catalyst activity and implement high nitrogen monoxide (NO) conversion efficiency even though it is used under the high temperature or vulcanization condition for a long time.

In addition, the present invention has been made in an effort to provide a preparation method of the catalyst for diesel particle filter.

Further, the present invention has been made in an effort to provide a soot reduction device for diesel engine that includes the catalyst for diesel particle filter.

Various aspects of the present invention provide a catalyst for diesel particle filter that includes the platinum (Pt)-neodymium (Nd) alloy that is carried in silica.

Other aspects of the present invention provide a method for preparing a catalyst for diesel particle filter, which includes mixing a platinum (Pt) precursor and neodymium (Nd) precursor in an aqueous solution, carrying a mixture of the platinum (Pt) precursor and neodymium (Nd) precursor in silica, and calcining the mixture of the platinum (Pt) precursor and neodymium (Nd) precursor that is carried in silica.

Yet other aspects of the present invention provide a soot reduction device for diesel engine that includes the diesel particle filter that includes the catalyst.

Hereinafter, the catalyst for diesel particle filter according to various aspects of the present invention, the preparation method thereof and the soot reduction device for diesel engine including the same will be described in detail.

According to various aspects of the present invention, there may be provided a catalyst for diesel particle filter that includes the platinum (Pt)-neodymium (Nd) alloy that is carried in silica.

In the soot reduction device for diesel engine, particularly, diesel particle filter, because of the high temperature condition and continuously inflowing sulfur, the activity of the catalyst is easily deteriorated, such that the regeneration cycle of the diesel particle filter is shortened. In addition, since the device for decomposing or reducing NOx is installed at the front end of the diesel particle filter, the natural regeneration effect of soot by the reaction of soot in the filter and $NO_2$ of the exhaust gas is deteriorated.

Therefore, the present inventors have performed a study of the catalyst that is used in the diesel particle filter, and confirmed that if the platinum (Pt)-neodymium (Nd) alloy that is carried in silica is used in the catalyst for diesel particle filter, it can maintain high catalyst activity and implement high nitrogen monoxide (NO) conversion efficiency even though it is exposed under the high temperature or vulcanization condition for a long time through a test, thereby accomplishing the present invention.

The characteristic of the catalyst for diesel particle filter is caused by an interaction between the silica carrier and the metal alloy. If the platinum (Pt)-neodymium (Nd) alloy is carried in silica, a stable amorphous Nd—O—Si film is formed on a silica, such that the platinum particle on the catalyst is prevented from being agglomerated or calcined at the high temperature or the surface area of the silica carrier is prevented from being decreased, thus largely increasing a life span of the catalyst and implementing high nitrogen monoxide (NO) conversion efficiency even though it is exposed under the high temperature or vulcanization condition for a long time.

Particularly, in the platinum (Pt)-neodymium (Nd) alloy, if the molar ratio of platinum and neodymium is 1:0.1 to 1:1.2, and preferably 1:0.4 to 1:0.8, even though it is exposed under the high temperature or/and vulcanization condition for a long time, the activity of the catalyst is not largely deteriorated, such that the natural regeneration effect of soot by the reaction of soot in the diesel particle filter and $NO_2$ of the exhaust gas may be largely increased.

The content of platinum in the catalyst for diesel particle filter may be 0.1 to 10 wt %. In the case of when the content of platinum is less than 0.1 wt %, the oxidation activity of CO, uncombusted hydrocarbon and NO may not be shown, and in the case of when it is more than 10 wt %, since a further addition has no meaning, it is disadvantageous in terms of economic efficiency.

Meanwhile, the catalyst for diesel particle filter may have one $H_2$— temperature programmed reduction (TPR) peak at 400 to 800° C. As shown in FIG. 7, in the case of when a known $Pt/SiO_2$ catalyst is aged under the high temperature or vulcanization condition, the reduction peak of the platinum oxide is shown at around 230° C., but in the case of the catalyst of various embodiments through the heat treatment (TA-SA), it is confirmed that the reduction peak of the platinum oxide is not shown and one $H_2$-TPR peak is shown at 400 to 800° C. Accordingly, the catalyst for diesel particle filter minimizes the generation of platinum oxide that can deteriorate the activity of the catalyst, thus largely increasing the catalyst activity and life span.

According to other embodiments of the present invention, there may be provided a method for preparing a catalyst for diesel particle filter, which includes mixing a platinum (Pt) precursor and neodymium (Nd) precursor in an aqueous solution, carrying a mixture of the platinum (Pt) precursor and neodymium (Nd) precursor in silica, and calcining the mixture of the platinum (Pt) precursor and neodymium (Nd) precursor that is carried in silica.

The catalyst for the diesel particle filter that is prepared by using the preparation method, that is, the platinum (Pt)-neodymium (Nd) alloy that is carried in silica is used in the catalyst for diesel particle filter, it can maintain high catalyst activity and implement high nitrogen monoxide (NO) conversion efficiency even though it is exposed under the high temperature or vulcanization condition for a long time.

The platinum precursor and neodymium precursor may be used without a separate limit if it can form the platinum (Pt)-neodymium (Nd) alloy, but it is preferable that as the platinum precursor, $H_2PtCl_6$, $H_2PtCl_4$, $NH_{42}PtCl_6$, $NH_{42}PtCl_4$, $NH_{42}PtCl_6$, $NH_{42}PtCl_4$, $K_2PtCl_6$, $K_2PtCl_4$, $NH_{42}PtNO_{34}$, $K_2PtNO_{34}$, $PtNH_{32}Cl_4$, Pt $NH_{32}NO_{34}$, $(R-NH_3)_2Pt(OH)_6$ or a mixture thereof is used.

In addition, it is preferable that as the neodymium precursor, nitrates, carbonates, halogenates, or the like of neodymium is used.

In the mixing the platinum precursor and neodymium precursor in the aqueous solution, a general stirring or mixing method may be used without a separate limit, but in order to form the uniform mixture, it is preferable that they are stirred in the aqueous solution that includes distilled water at a room temperature for 2 to 10 hours.

The mixture of the platinum (Pt) precursor and neodymium (Nd) precursor may be carried in silica by using various methods in an aqueous or colloid phase, and in order to easily and rapidly carry it in the aqueous phase, it is preferable that an incipient wetness method is used.

After the carrying of the mixture of the platinum (Pt) precursor and neodymium (Nd) precursor in silica, the drying of the carried mixture may be applied, and in this drying, a method for drying a generally known carrier on aqueous solution may be used without a limit Meanwhile, if the mixture of the platinum (Pt) precursor and neodymium (Nd) precursor that is carried in silica is calcined, the platinum (Pt) precursor and neodymium (Nd) precursor are reacted with each other, such that the platinum (Pt)-neodymium (Nd) alloy may be formed and the platinum (Pt)-neodymium (Nd) alloy may be fixed to silica. The calcining may be performed at 300 to 600° C.

In addition, as described above, in the platinum (Pt)-neodymium (Nd) alloy, the molar ratio of the platinum and neodymium may be 1:0.1 to 1:1.2, and preferably 1:0.4 to 1:0.8.

After the calcining is finished, if the result material is heat treated under hydrogen atmosphere, the platinum (Pt)-neodymium (Nd) alloy may be rapidly and completely reduced. Therefore, the method for preparing a catalyst for diesel particle filter may further includes heat treating the result material that is obtained in the calcining under hydrogen atmosphere at 200 to 500° C. for 1 to 5 hours.

Meanwhile, according to other embodiments of the present invention, there may be provided a soot reduction device for diesel engine that includes the diesel particle filter that includes the catalyst.

As described above, the catalyst for diesel particle filter that includes the platinum (Pt)-neodymium (Nd) alloy that is carried in silica can maintain high catalyst activity and implement high nitrogen monoxide (NO) conversion efficiency even though it is used under the high temperature or vulcanization condition for a long time. Accordingly, if the catalyst for diesel particle filter is applied to the soot reduction device for diesel engine, since the excellent catalyst activity and nitrogen monoxide (NO) conversion efficiency may be implemented, the regeneration cycle of the diesel particle filter may be increased, the cost of the noble metal included therein may be lowered by preventing the deterioration of the LNT catalyst due to frequent regeneration of the diesel particle filter, and fuel efficiency of the diesel engine may be improved by increasing the natural regeneration efficiency of the diesel particle filter.

The soot reduction device for diesel engine may further include a storage and reduction type NOx removing catalyst device that is installed at the front end of the diesel particle filter. The storage reduction type NOx removing catalyst device may adsorb NOx of the exhaust gas under the condition where a lean air-fuel ratio is $\lambda>1$, and may detach and reduce NOx of the exhaust gas under the condition where a theoretical air-fuel ratio or rich air-fuel ratio is $\lambda=1$.

According to the installation of the storage and reduction type NOx removing catalyst device, the amount of nitrogen dioxide that inflows to the diesel particle filter may be lowered to deteriorate the natural regeneration effect of the soot in the filter and the soot by the reaction of $NO_2$ in the exhausting, and since the catalyst for diesel particle filter that includes the platinum (Pt)-neodymium (Nd) alloy that is carried in silica may convert nitrogen monoxide (NO) into nitrogen dioxide at high efficiency in the filter, the natural oxidation reaction efficiency of the soot may be increased.

According to various embodiments of the present invention, there may be provided a catalyst for diesel particulate filter that can maintain high catalyst activity and implement high nitrogen monoxide (NO) conversion efficiency even though it is used under the high temperature or vulcanization condition for a long time, a preparation method thereof and a soot reduction device for diesel engine including the same.

DETAILED DESCRIPTION

Figure 1:
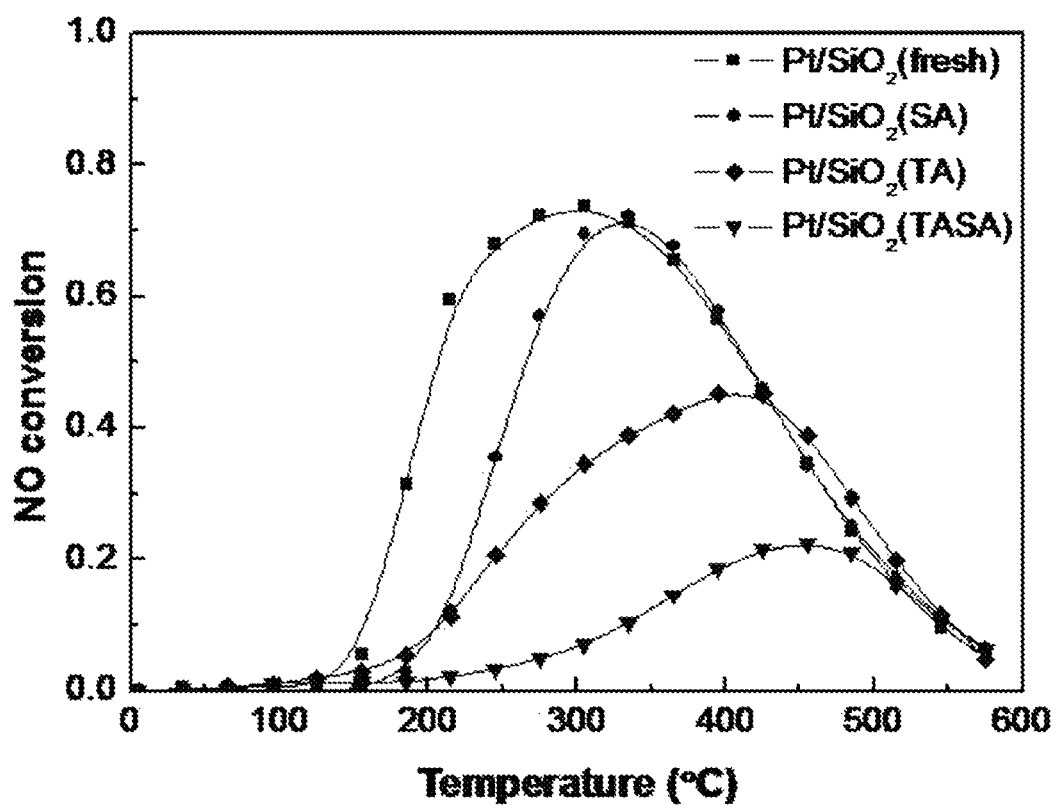
FIG. 1 illustrates the NO oxidation reaction test result of 1 wt % of $Pt/SiO_2$ and $XPtYNd/SiO_2$ (X:Y=1:0.25, 1:0.5, 1:1) catalyst before deterioration.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

EXAMPLE

Preparation of the Catalyst for Diesel Particle Filter

A predetermined amount of hexachloroplatinate (IV) ($H_2PtCl_6$) and neodymium (III) nitrate hexahydrate [$Nd(NO_3)_3 \cdot 6H_2O$] were added to 30 ml of distilled water, and stirred for 5 hours, and in this case, the molar ratio (X:Y) of Pt and Nd was each 1:0.25, 1:0.5 and 1:1. The mixture of the obtained platinum (Pt) precursor and neodymium (Nd) precursor was carried in 3 g of silica (Cabot, CAB-β-SIL, M-5) by using the incipient wetness method.

The mixture that was carried in the silica was dried in the oven at 100° C. for 24 hours. In addition, the sample in the dried solid state was put into the crucible, the temperature thereof was increased at the speed of 5° C./min to 500° C., and it was heat treated for 3 hours, and slowly cooled. After the temperature of the cooled sample was increased at the speed of 5° C./min to 300° C., it was heat treated and reduced under the hydrogen atmosphere for 3 hours, such that the platinum (Pt)-neodymium (Nd) alloy catalyst that was carried in silica was obtained.

EXPERIMENTAL EXAMPLE

Measurement of Physical Properties of the Catalyst for Diesel Particle Filter

The catalyst for diesel particle filter that was obtained in the above Example was 1) heat treated at 750° C. for 24 hours (Thermal Aging, hereinafter, referred to as 'TA'), and 2) heat treated at 350° C. for 24 hours while 1000 ppm of $SO_2$ flew (Sulfur Aging, hereinafter, referred to as 'SA').

In addition, $Pt/SiO_2$ (Platinum on silica, Engelhard) that was conventionally used as the DPF catalyst was used as the control group for physical property comparison, and $Pt/SiO_2$ was 1) heat treated at 750° C. for 24 hours, and 2) heat treated at 350° C. for 24 hours while 1000 ppm of $SO_2$ flew, like the catalyst of Example.

Experimental Example 1

Measurement of BET Surface Area

The specific surface area of the carrier was largely changed according to a destroy of the pore and a change of the structure by deterioration, and in order to observe the change of the specific surface area of the carrier according to the temperature, the specific surface area of the catalyst was measured before/after the TA heat treatment.

In detail, the BET surface area was measured by using ASAP 2010 manufactured by Micromeritics, Co., Ltd., and the result is described in the following Table 1.

TABLE 1

| BET surface area measurement result | | | | | |
|---|---|---|---|---|---|
| | | Pt | 1Pt—0.25Nd | 1Pt—0.5Nd | 1Pt—1Nd |
| BET surface area (m2/g) | Before TA heat treatment | 196.3 | 195.9 | 195.1 | 195.6 |
| BET surface area (m2/g) | After TA heat treatment | 164.6 | 178.8 | 182.5 | 184.4 |

As shown in the Table 1, in the case of the catalyst that included neodymium (Nd), it was confirmed that the reduction of the specific surface area after the heat treatment was not large. Particularly, as the content of neodymium is increased, there was no large change of the specific surface area after the thermal aging. This is because the stable amorphous Nd—O—Si film is formed on silica and calcination of silica that is the carrier by heat or the destroy of the pore may be minimized.

Accordingly, the catalyst for diesel particle filter may minimize the agglomeration or calcination degree of the platinum particle on the catalyst in the soot reduction device for diesel engine in which high temperature heat may be generated, and the high activity of the catalyst may be maintained for a long time under the high temperature condition in order to prevent reduction of the surface area of the silica carrier.

Experimental Example 2

X-Ray Diffraction Analysis

Figure 3:
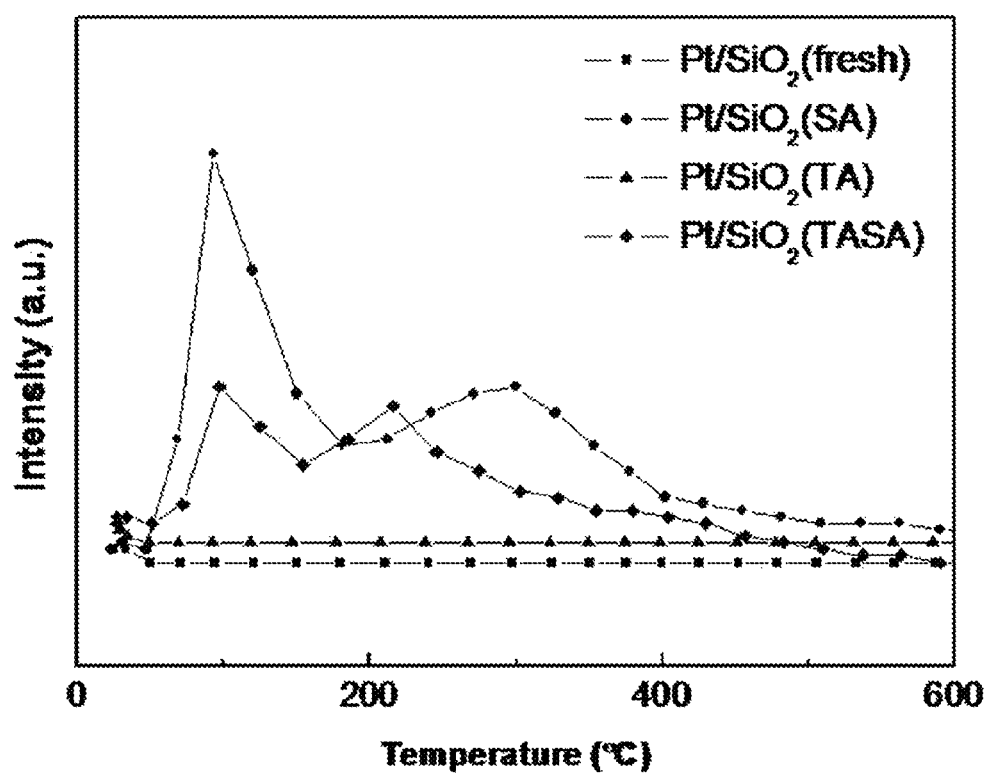
FIG. 3 illustrates the X-ray diffraction (XRD) analysis result of 1 wt % of $Pt/SiO_2$ and $XPtYNd/SiO_2$ (X:Y=1:0.25, 1:0.5, 1:1) catalyst after deterioration.

In order to confirm the crystal structure of the catalyst of Example through the TA-SA heat treatment, the X-ray diffraction (XRD) analysis was performed, and the result is shown in FIG. 3. As shown in FIG. 3, as the content of neodymium (Nd) was increased, it was confirmed that the XRD peak of platinum (Pt) was moved to the left. The movement of the XRD peak was caused by forming the alloy of platinum and neodymium.

In accordance with the formation of the alloy of platinum and neodymium, the interaction between the silica carrier and the metal alloy is changed, the activity of the catalyst is not deteriorated under the high temperature or vulcanization condition.

Figure 6:
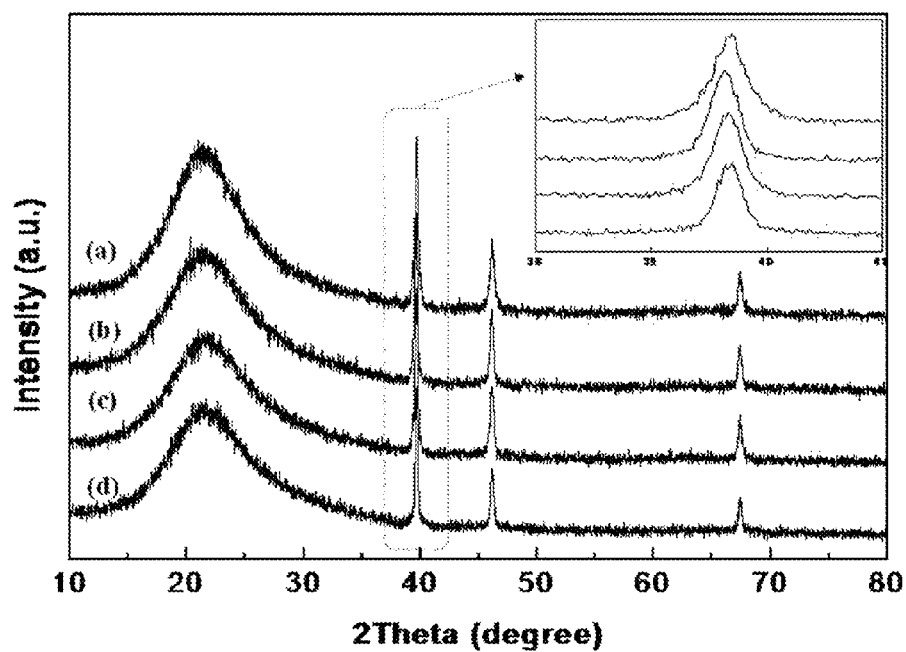
FIG. 6 illustrates the X-ray diffraction (XRD) analysis result of $Pt/SiO_2$ that is deteriorated under each condition (fresh, TA, SA, TASA).

In addition, in respect to the heat treated $Pt/SiO_2$, the X-ray diffraction (XRD) analysis was performed, and the result is shown in FIG. 6. As shown in FIG. 6, in the 2 theta region of 40 degree, it can be seen that the intensity of the peak of the $Pt/SiO_2$ catalyst that was TA treated was more sharp than that of the $Pt/SiO_2$ catalyst that was not TA treated, which means that since platinum (Pt) was calcined, its size was increased. That is, if the $Pt/SiO_2$ catalyst was aged under the high temperature or/and vulcanization condition, it was confirmed that the platinum particles were agglomerated and the activity of the catalyst is deteriorated.

Experimental Example 3

Measurement of Nitrogen Monoxide (NO) Conversion Efficiency

Figure 2:
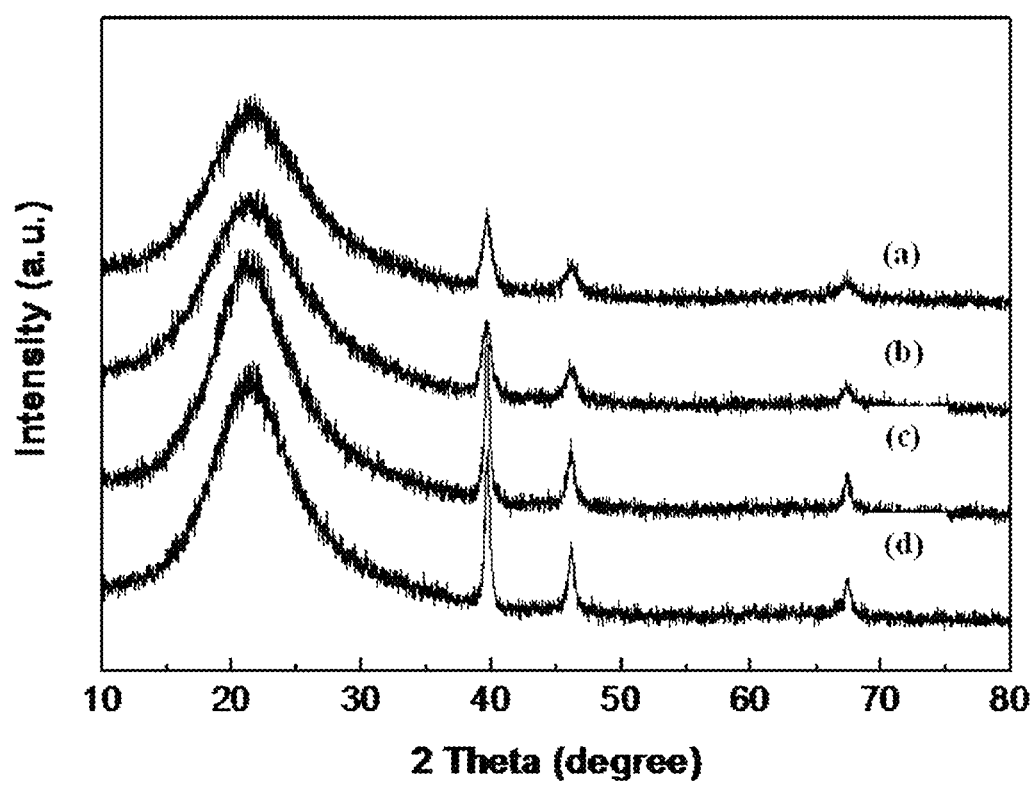
FIG. 2 illustrates the NO oxidation reaction test result of 1 wt % of $Pt/SiO_2$ and $XPtYNd/SiO_2$ (X:Y=1:0.25, 1:0.5, 1:1) catalyst after deterioration.
Figure 5:
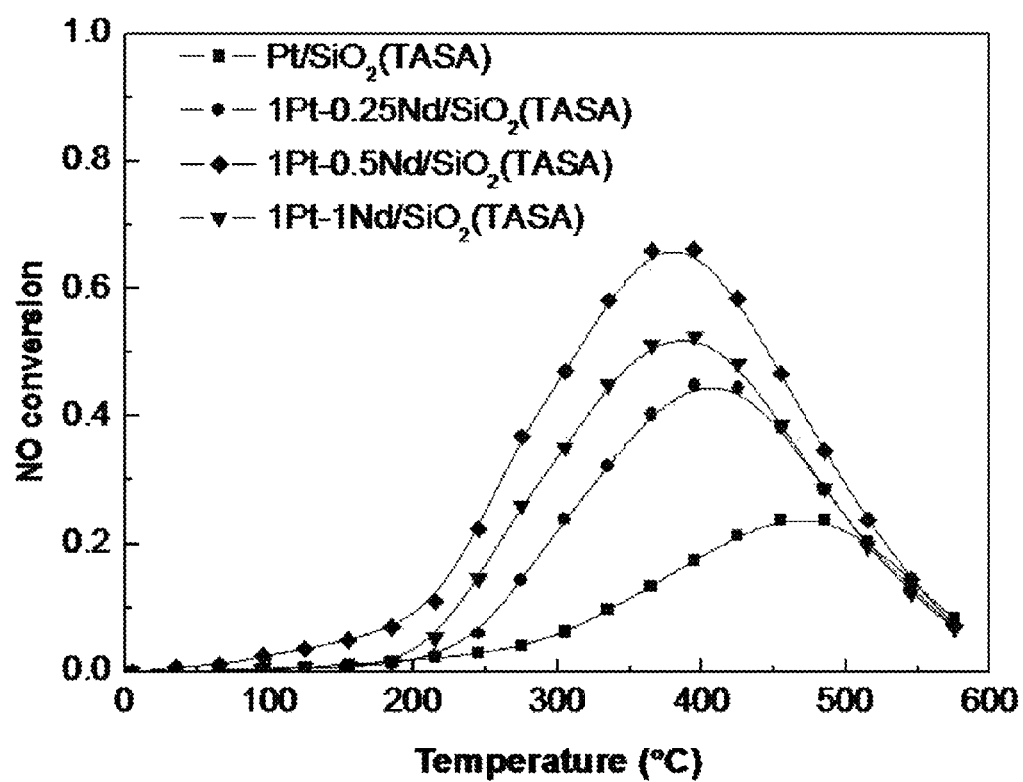
FIG. 5 illustrates the NO oxidation reaction test result of $Pt/SiO_2$ that is deteriorated under each condition (fresh, TA, SA, TASA).

In respect to the catalyst of Example that was TA-SA heat treated and heat treated $Pt/SiO_2$, the NO oxidation reaction test was performed, and the result is shown in FIG. 2 and FIG. 5.

In detail, the NO oxidation reaction test measured the activity by after putting the catalyst of Example and $Pt/SiO_2$ into the fixed bed reactor while 555 ppm of NO and 10% of $O_2/N_2$ gas flew so that the entire flow rate was 400 ml/min and the space speed was 80,000/h, and using the NOx analysis device (42i-HL, Thermo electron corporation) with a chemi-luminescence method.

From the comparison results of FIG. 1 and FIG. 2, it was confirmed that if the catalyst for diesel particle filter of Example was used, even though it was aged under the high temperature or/and vulcanization condition, the nitrogen monoxide (NO) conversion efficiency was largely not lowered. Particularly, it was confirmed that the catalyst for diesel particle filter in which the molar ratio of platinum and neodymium was 1:0.5 constantly maintained the nitrogen monoxide (NO) conversion efficiency after the TA-SA treatment. Accordingly, if the platinum (Pt)-neodymium (Nd) alloy that is carried in silica is used as the catalyst for diesel particle filter, excellent heat resistance characteristic and resistance to sulfur characteristic may be implemented, and high catalyst activity may be maintained even though it is used in the soot reduction device for diesel engine for a long time.

On the other hand, as shown in FIG. 5, it was confirmed that the $Pt/SiO_2$ catalyst (TASA) that was aged under the high temperature and vulcanization condition showed the low nitrogen monoxide (NO) conversion efficiency. Particularly, since the $Pt/SiO_2$ catalyst that was SA treated had the higher activity than the $Pt/SiO_2$ catalyst that was TA treated, it is seen that the activity of the $Pt/SiO_2$ catalyst was largely lowered in accordance with the calcination and agglomeration of the platinum (Pt) at the high temperature.

Experimental Example 4

$H_2$-TPR (Temperature Programmed Reduction) Analysis Test

Figure 4:
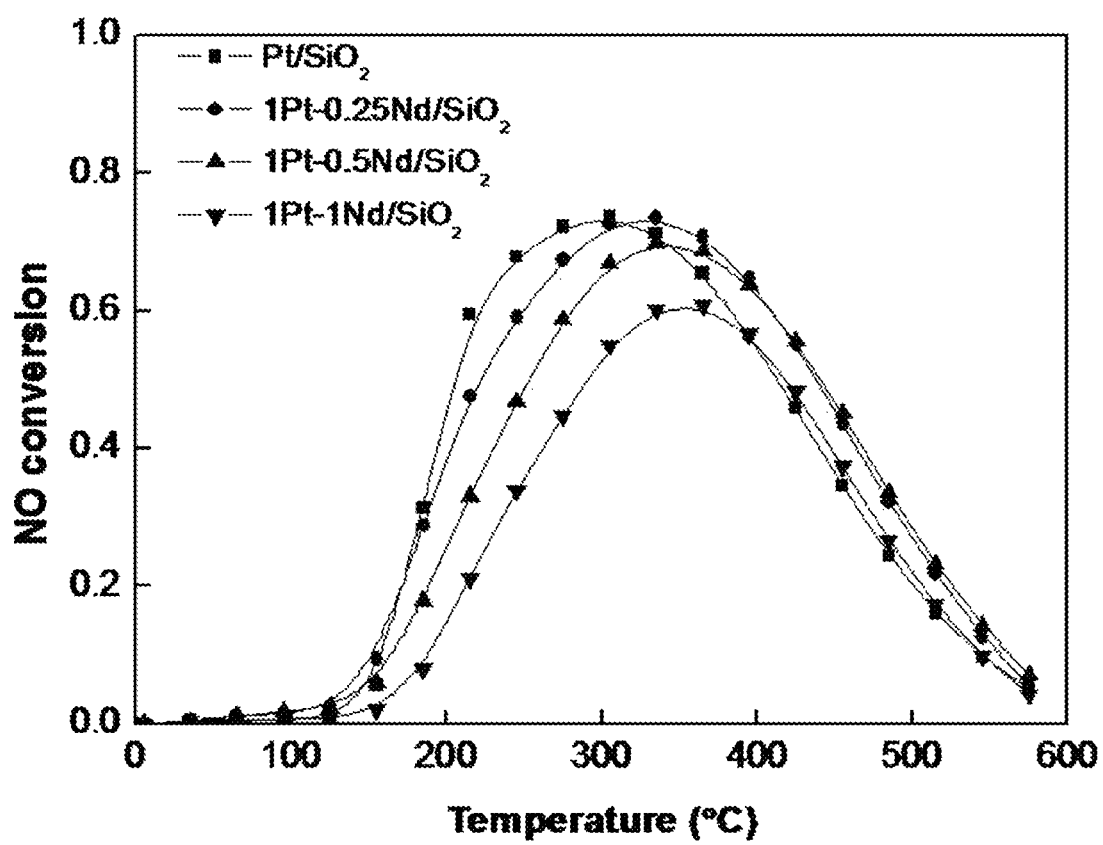
FIG. 4 illustrates the TPR analysis result of 1 wt % of $Pt/SiO_2$ and $XPtYNd/SiO_2$ (X:Y=1:0.25, 1:0.5, 1:1) catalyst after deterioration.

In respect to the catalyst of Example that was heat treated (TA-SA) and $Pt/SiO_2$ that was heat treated (TA-SA), the $H_2$-TPR (temperature programmed reduction) analysis was performed, and the result is shown in FIG. 4. In addition, in respect to $Pt/SiO_2$ that was heat treated, the $H_2$-TPR analysis was performed, and the result is shown in FIG. 7.

In the $H_2$-TPR analysis, the BELCAT-B TPD device (BEL JAPAN INC.) was used.

Figure 7:
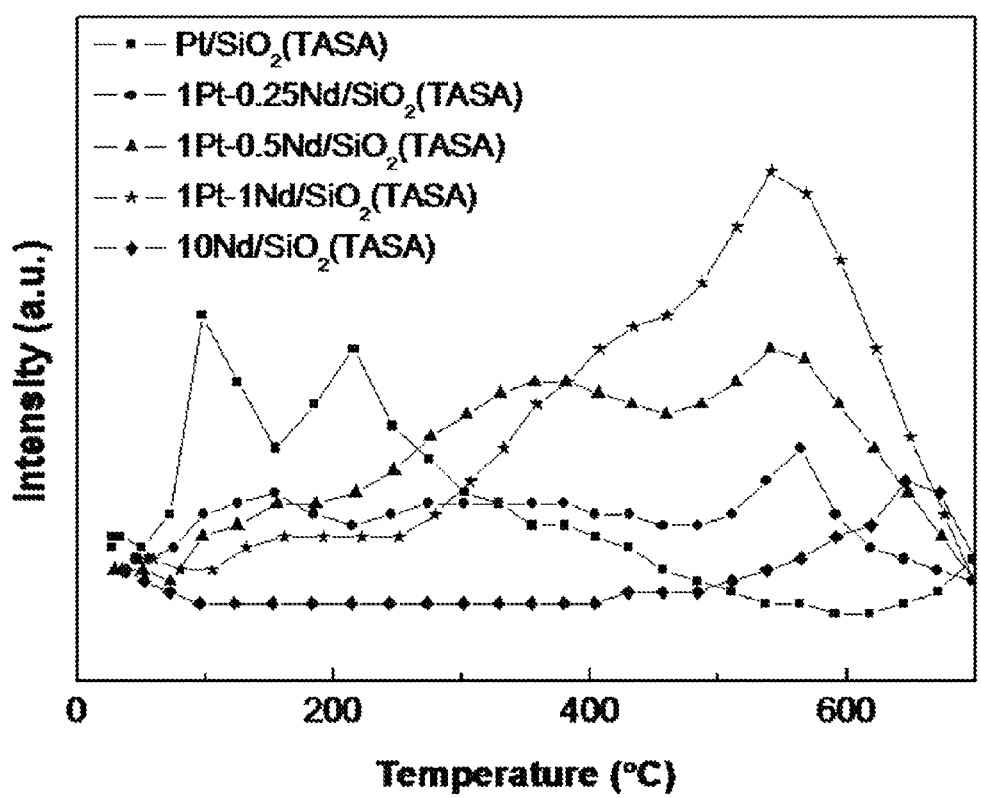
FIG. 7 illustrates the TPR analysis result of $Pt/SiO_2$ that is deteriorated under each condition (fresh, TA, SA, TASA).

As shown in FIG. 7, in the case of the $Pt/SiO_2$ catalyst that was TA or TASA treated, the reduction peak of platinum oxide was shown at around 100° C. Particularly, in the case of the $Pt/SiO_2$ catalyst that was TASA treated, the reduction peak of platinum oxide was shown at around 230° C.

On the other hand, in the case of the catalyst of Example that was heat treated (TA-SA), it was confirmed that only one reduction peak was shown at around 400 to 800° C. From the test result, according to adding neodymium, the reduction peak of platinum oxide at around 230° C. was not shown, which is caused by the formation of the alloy of platinum and neodymium.

Therefore, the platinum (Pt)-neodymium (Nd) alloy that is carried in silica is used as the catalyst for diesel particle filter, since it is possible to minimize the generation of platinum oxide that deteriorates the activity of the catalyst, it is possible to implement the excellent catalyst activity and nitrogen monoxide (NO) conversion efficiency.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for preparing a catalyst for diesel particle filter, the method comprising:
   mixing a platinum precursor and neodymium precursor in an aqueous solution;
   carrying a mixture of the platinum (Pt) precursor and neodymium (Nd) precursor in silica; and
   calcining the mixture of the platinum (Pt) precursor and neodymium (Nd) precursor that is carried in silica;
   wherein the calcining of the mixture of the platinum (Pt) precursor and neodymium (Nd) precursor that is carried in silica includes:
   forming a platinum (Pt)-neodymium (Nd) alloy; and
   fixing the platinum (Pt)-neodymium (Nd) alloy to silica.

2. The method of claim 1, wherein:
   the calcining of the mixture of the platinum (Pt) precursor and neodymium (Nd) precursor that is carried in silica is performed at 300 to 600° C.

3. The method of claim 1, wherein:
   in the platinum (Pt)-neodymium (Nd) alloy, a molar ratio of platinum and neodymium is 1:0.1 to 1:1.2.

4. The method of claim 1, wherein:
   in the platinum (Pt)-neodymium (Nd) alloy, a molar ratio of platinum and neodymium is 1:0.4 to 1:0.8.

5. The method of claim 1, further comprising:
   heat treating the result material that is obtained in the calcining under hydrogen atmosphere at 200 to 500° C. for 1 to 5 hours.

* * * * *